(12) United States Patent
Tsujita et al.

(10) Patent No.: US 10,479,148 B2
(45) Date of Patent: Nov. 19, 2019

(54) RECEIVER AND TRANSMITTER UNIT

(71) Applicant: PACIFIC INDUSTRIAL CO., LTD., Ogaki-shi, Gifu-ken (JP)

(72) Inventors: Yasuhisa Tsujita, Motosu (JP); Keiyu Fujii, Ibi-gun (JP)

(73) Assignee: PACIFIC INDUSTRIAL CO., LTD., Ogaki-Shi, Gifu-Ken (JP)

( * ) Notice: Subject to any disclaimer, the term of this patent is extended or adjusted under 35 U.S.C. 154(b) by 0 days.

(21) Appl. No.: 15/765,435

(22) PCT Filed: Apr. 27, 2017

(86) PCT No.: PCT/JP2017/016766
§ 371 (c)(1),
(2) Date: Apr. 2, 2018

(87) PCT Pub. No.: WO2018/198269
PCT Pub. Date: Nov. 1, 2018

(65) Prior Publication Data
US 2019/0070911 A1    Mar. 7, 2019

(51) Int. Cl.
*B60C 23/04* (2006.01)

(52) U.S. Cl.
CPC ...... *B60C 23/0489* (2013.01); *B60C 23/0416* (2013.01); *B60C 23/0459* (2013.01); *B60C 23/0488* (2013.01)

(58) Field of Classification Search
USPC .............................. 340/445, 447; 1/1; 701/49
See application file for complete search history.

(56) References Cited

U.S. PATENT DOCUMENTS

| | | | | |
|---|---|---|---|---|
| 5,764,137 | A * | 6/1998 | Zarkhin | B60C 23/061 340/442 |
| 10,160,270 | B2 * | 12/2018 | Araya | B60C 23/04 |
| 2006/0012469 | A1 * | 1/2006 | Hirai | B60C 23/0416 340/445 |
| 2011/0071737 | A1 * | 3/2011 | Greer | B60C 23/0416 701/49 |

(Continued)

FOREIGN PATENT DOCUMENTS

CN    102252691 A    11/2011
EP    2759418 A1    7/2014

(Continued)

OTHER PUBLICATIONS

Office Action issued in Korean Patent Application No. 10-2018-7009683, dated Apr. 26, 2019; 4 pages.

(Continued)

*Primary Examiner* — Masud Ahmed
(74) *Attorney, Agent, or Firm* — Canton Colburn LLP (57) ABSTRACT

A reception control section obtains a rotation angle of each wheel assembly when a reception circuit receives transmission data. The reception control section calculates the absolute value of the difference between the obtained rotation angle and a previously obtained rotation angle. The reception control section determines whether the absolute value of the difference is included in a reference range or a specific range. The reference range includes 0. The specific range includes the angle difference between specific angles.

2 Claims, 4 Drawing Sheets

(56) References Cited

U.S. PATENT DOCUMENTS

| | | | |
|---|---|---|---|
| 2012/0112899 A1* | 5/2012 | Hannon | B60C 23/0416 340/445 |
| 2014/0055255 A1* | 2/2014 | Kim | B60C 23/0416 340/442 |
| 2014/0184403 A1* | 7/2014 | Kosugi | B60C 23/0416 340/447 |
| 2015/0191056 A1 | 7/2015 | Mori et al. | |
| 2017/0259627 A1 | 9/2017 | Araya | |

FOREIGN PATENT DOCUMENTS

| | | | |
|---|---|---|---|
| JP | 2012111481 A | 6/2012 | |
| JP | 2014227124 A | 12/2014 | |
| JP | 201513635 A | 1/2015 | |
| JP | 2015013635 A | 1/2015 | |
| KR | 101388622 B1 | 4/2014 | |
| KR | 1020150041023 A | 4/2015 | |
| KR | 20170040780 A | 4/2017 | |
| WO | 2016190371 A1 | 1/2016 | |

OTHER PUBLICATIONS

Notification of Reason for Refusal issued in Korean Patent Application No. 10-2018-7014506, dated Jul. 23, 2019; 8 pages.
Supplementary European Search Report issued in Application No. 17851949.2-1215, dated Sep. 12, 2019; 7 pages.

\* cited by examiner

| Group | First Group | Second Group | Third Group | Fourth Group |
|---|---|---|---|---|
| Last Digit of ID | 0~3 | 4~7 | 8~B | C~F |
| Specific Angle | First Angle Second Angle | First Angle Third Angle | First Angle Fourth Angle | First Angle Fifth Angle |
| Angle Difference | 180° | 90°, 270° | 120°, 240° | 150°, 210° |
| Specific Range | 180°±Predetermined Value | 90°±Predetermined Value 270°±Predetermined Value | 120°±Predetermined Value 240°±Predetermined Value | 150°±Predetermined Value 210°±Predetermined Value |

RECEIVER AND TRANSMITTER UNIT

TECHNICAL FIELD

The present disclosure relates to a receiver and a transmitter unit.

BACKGROUND ART

A tire condition monitoring apparatus is known as an apparatus that allows a driver to check the condition of the tires of a vehicle from the passenger compartment. The tire condition monitoring apparatus includes transmitters respectively attached to the wheel assemblies, and a receiver mounted on the vehicle. Each of the transmitters transmits transmission data to the receiver. The transmission data transmitted from the transmitter includes data indicating the condition of the tire. The receiver receives the transmission data to acquire the condition of the tire.

In the tire condition monitoring apparatus described above, it is preferable that the receiver can identify the tire to which the tire condition included in the transmission data corresponds. In other words, it is preferable that the receiver can identify the wheel assembly to which the transmitter that has transmitted the received transmission data is attached. This type of tire condition monitoring apparatus is disclosed in Patent Document 1.

The tire condition monitoring apparatus disclosed in Patent Document 1 is mounted on a vehicle including rotation angle detecting devices that detect the rotation angles of the wheel assemblies. When detecting that the rotation angle of the wheel assembly matches a specific angle, the transmitter transmits transmission data. The receiver obtains the rotation angle of each wheel assembly from the rotation angle detecting device upon reception of the transmission data. The receiver identifies the wheel assembly to which each of the transmitters is attached based on variation of the rotation angle of each wheel assembly obtained upon reception of the transmission data.

There is a null point, at which the transmission data transmitted from the transmitters mutually interferes depending on the kind of vehicle. In a case in which the specific angle at which the transmission data is transmitted matches the null point, the receiver cannot receive the transmission data transmitted at the specific angle. As a result, it may be impossible to identify the wheel assembly to which each of the transmitters is attached. Thus, multiple specific angles at which transmission data is transmitted are set in some cases.

In a case in which multiple specific angles are set, the rotation angles obtained upon reception of the transmission data are classified for each specific angle at which the transmission data is transmitted. Further, variation is obtained for each of the classified rotation angles.

PRIOR ART DOCUMENT

Patent Document

Patent Document 1: Japanese Laid-Open Patent Publication No. 2014-227124

SUMMARY OF THE INVENTION

Problems that the Invention is to Solve

In a receiver that identifies the wheel assembly to which each of the transmitters is attached by using a difference of numbers of rotations (rotation speeds) of the wheel assemblies in association with travelling, it is necessary to obtain a plurality of the rotation angles as the rotation angles obtained upon reception of the transmission data transmitted at the same specific angle. In this case, when multiple specific angles are set, the number of times of obtainment of the rotation angles is dispersed in accordance with the number of the specific angles. With this, the time for obtaining the rotation angles necessary for identifying each of the transmitters becomes long compared to a case in which the transmission data is transmitted at one specific angle (a certain angle). This extends the time necessary for identifying the wheel assembly to which each of the transmitters is attached.

An objective of the present disclosure is to provide a receiver and a transmitter unit capable of reducing the time necessary for identifying the wheel assembly to which each of the transmitters is attached.

Means for Solving the Problems

To achieve the foregoing objective and in accordance with a first aspect of the present invention, a receiver is provided that is configured to be mounted on a vehicle having rotation angle detecting sections each of which detects a rotation angle of one of wheel assemblies. A transmitter is attached to each wheel assembly. The receiver is configured to identify the wheel assembly to which each transmitter is attached. The receiver includes a receiving section, an obtaining section, a calculation section, and an identifying section. The receiving section is configured to receive transmission data that is transmitted from each transmitter when the transmitter detects that the associated wheel assembly is at any of specific angles set in possible rotation angles of the wheel assembly. The obtaining section is configured to obtain the rotation angle from the rotation angle detecting section upon reception of the transmission data by the receiving section. The calculation section is configured to calculate a difference between the rotation angle obtained by the obtaining section and a previously obtained rotation angle. The identifying section is configured to determine whether the difference calculated by the calculation section is included in a predetermined range and associates an ID code included in the transmission data with the wheel assembly based on the number of times the difference is included in the range. The range includes a reference range that includes 0 and a specific range that includes an angle difference between different specific angles.

When a vehicle is travelling, the numbers of rotations (rotation speeds) of the wheel assemblies are different from each other. Each of the transmitters transmits the transmission data when the transmitter detects that the rotation angle of the wheel assembly matches the specific angle. Thus, in a case in which the rotation angle is obtained upon reception of the transmission data, variation of the rotation angle of the wheel assembly to which the transmitter that has transmitted the transmission data is attached becomes the minimum. By using this, it is possible to identify the wheel assembly to which each of the transmitters is attached based on the number of times the difference between the rotation angle obtained upon reception of the transmission data and a previously obtained rotation angle is included in a predetermined range.

In a case in which a rotation angle obtained upon reception of the transmission data and a previously obtained rotation angle are both obtained upon reception of the transmission data transmitted at the same specific angle, the difference between the rotation angle and the previously obtained rotation angle is included in the reference range. Further, in a case in which a rotation angle obtained upon reception of the transmission data and a previously obtained rotation angle are obtained upon reception of the transmission data transmitted at different specific angles, the difference between the rotation angle and the previously obtained rotation angle is included in the specific range. Accordingly, it is possible to identify the wheel assembly to which each of the transmitters is attached without independently obtaining the differences at each rotation angle obtained upon reception of the transmission data transmitted at the same specific angle. Accordingly, the number of obtainments (the number of samples) of the specific rotation angle necessary for identifying the wheel assembly to which each of the transmitters is attached is not dispersed. This reduces the time necessary for identifying the wheel assembly to which each of the transmitters is attached.

In the above described receiver, the angle difference preferably varies among the transmitters, and the receiver further preferably includes a reception storage section that stores the ID codes of the transmitters while associating the ID codes with the specific range.

With this, the receiver is capable of identifying the wheel assembly to which each of the transmitters is attached based on whether the angle difference between the different specific angles matches the value of the ID code, in addition to whether the difference between an obtained rotation angle and a previously obtained rotation angle is included in the reference range or the specific range. Accordingly, the reliability of the receiver is improved.

To achieve the foregoing objective and in accordance with a second aspect of the present invention, a transmitter unit is provided that includes a plurality of transmitters, each of which is configured to be attached to one of wheel assemblies of a vehicle each having a rotation angle detecting section that detects a rotation angle of the associated wheel assembly and transmits transmission data to a receiver mounted on the vehicle. The receiver is configured to identify the wheel assembly to which each transmitter is attached based on whether a difference between the rotation angle obtained from the rotation angle detecting section upon reception of the transmission data and a previously obtained rotation angle is included in a plurality of predetermined ranges. Each transmitter includes a transmission storage section in which an individual ID code is stored, a specific angle detecting section configured to detect that the wheel assembly is at any of specific angles set in possible rotation angles of the wheel assembly, and a transmission section configured to transmit the transmission data including the ID code when detecting that the rotation angle of the wheel assembly matches one of the specific angles, thereby causing the receiver to identify the wheel assembly to which the transmitter is attached. The angle difference between the different specific angles varies among the transmitters.

With this, each of the transmitters of the transmitter unit transmits the transmission data at the multiple specific angles. Thus, the receiver is capable of identifying the wheel assembly to which each of the transmitters is attached based on whether the difference between an obtained rotation angle and a previously obtained rotation angle is included in the reference range or the specific range. Further, each of the transmitters includes the angle difference between different specific angles, and the angle difference varies among the transmitters. Thus, the receiver is capable of identifying the wheel assembly to which each of the transmitters is attached based on whether the angle difference between the different specific angles matches the value of the ID code, in addition to whether the difference between an obtained rotation angle and a previously obtained rotation angle is included in the reference range or the specific range. Accordingly, the reliability of the receiver is improved.

Effects of the Invention

The present disclosure reduces the time necessary for identifying the wheel assembly to which each of the transmitters is attached.

MODES FOR CARRYING OUT THE INVENTION

First Embodiment

A receiver according to a first embodiment will now be described.

Figure 1A:
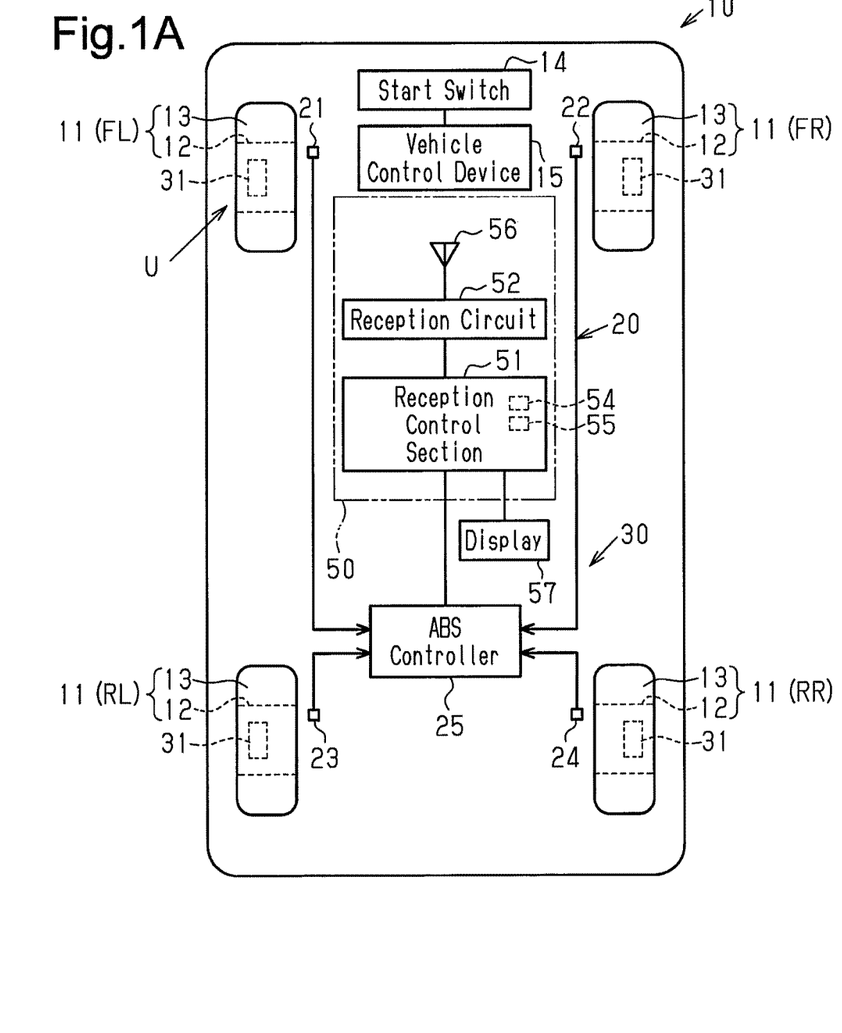
FIG. 1A is a block diagram illustrating a tire condition monitoring apparatus mounted on a vehicle.

As shown in FIG. 1A, a tire condition monitoring apparatus 30 is mounted on a vehicle 10. At first, the vehicle 10 is described.

The vehicle 10 includes a start switch 14 and a vehicle controller 15. The vehicle controller 15 switches the state of the vehicle 10 between an activated state and a deactivated state in accordance with operation of the start switch 14. In the activated state of the vehicle 10, the vehicle 10 travels based on operation of the driver to the acceleration pedal by the driver or an on-vehicle device such as the air conditioner operates based on operation of the on-vehicle device by the driver. In the deactivated state of the vehicle 10, the travelling of the vehicle 10 and the operation of the on-vehicle device are not allowed even if operation of the driver is performed.

The vehicle 10 includes four wheel assemblies 11. Each of the wheel assemblies 11 includes a wheel 12 and a tire 13 attached to the wheel 12. When necessary, the wheel assembly 11 at the right front side will be referred to as a right front wheel assembly FR, the wheel assembly 11 at the left front side will be referred to as a left front wheel assembly FL, the wheel assembly 11 at the right rear side will be referred to as the right rear wheel assembly RR, and the wheel assembly 11 at the left rear side will be referred to as a left rear wheel assembly RL.

The vehicle 10 includes an antilock braking system (ABS) 20. The ABS 20 includes an ABS controller 25, and rotation sensors 21 to 24 corresponding to the four wheel assemblies 11, respectively. The first rotation sensor unit 21 corresponds to the left front wheel assembly FL, and the second rotation sensor unit 22 corresponds to the right front wheel assembly FR. The third rotation sensor unit 23 corresponds to the left rear wheel assembly RL, and the fourth rotation sensor unit 24 corresponds to the right rear wheel assembly RR. The ABS controller 25 is configured by a microcomputer or the like so as to obtain the rotation angle of each of the wheel assemblies 11 based on signals from the rotation sensor units 21 to 24. The ABS controller 25 and the rotation sensor units 21 to 24 serve as a rotation angle detecting section.

Figure 2:
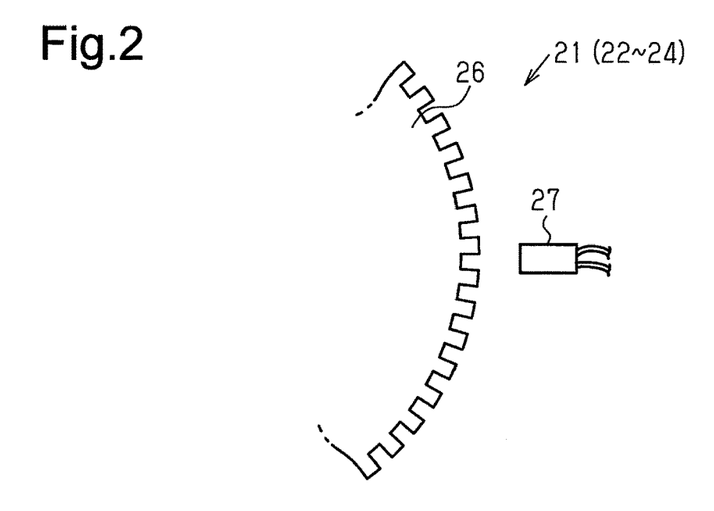
FIG. 2 is a schematic diagram of a rotation sensor unit.
Figure 3:
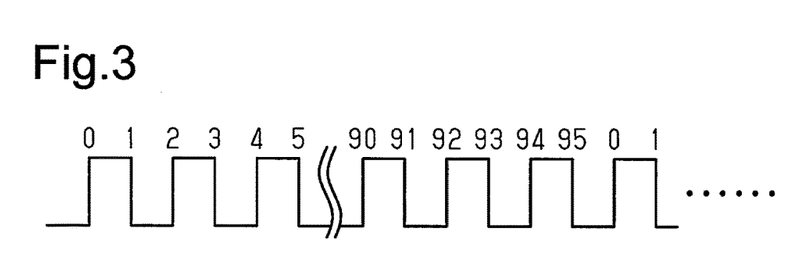
FIG. 3 is a schematic diagram of pulses generated by rotation of the wheel assembly.

As shown in FIG. 2, each of the rotation sensor units 21 to 24 includes a gear (pulse wheel) 26, which rotates integrally with the wheel assembly 11, and a detector 27 arranged to face the outer peripheral surface of the gear 26. Forty-eight teeth are arranged on the outer peripheral surface of the gear 26 at the same angular intervals. The detector 27 detects pulses generated when the gear 26 is rotated. The ABS controller 25 is connected to the detector 27 by wire and obtains the rotation angle of each of the wheel assemblies 11 based on a count value of the pulses (hereinafter, referred to as a pulse count value) as a detection value of each of the detectors 27. Specifically, when the gear 26 is rotated, the pulses corresponding to the number of the teeth are generated in the detector 27. The ABS controller 25 counts the pulses generated in the detector 27. As shown in FIG. 3, in the present embodiment, rising edges and falling edges of the pulses are counted. Since the number of the teeth is forty-eight, the ABS controller 25 counts the pulse from 0 to 95. Thus, the resolution of each of the rotation sensor units 21 to 24 is 3.75°.

The tire condition monitoring apparatus 30 will now be described.

As shown in FIG. 1A, the tire condition monitoring apparatus 30 includes a transmitter unit U and a receiver 50 installed in the vehicle 10. The transmitter unit U includes four transmitters 31 respectively attached to the four wheel assemblies 11. The transmitter 31 is attached to the wheel assembly 11 so as to be arranged in the inner space of the tire 13. The transmitter 31 is fixed to the tire valve, the wheel 12, or the tire 13. The transmitter 31 detects the state of tire air pressure and tire internal temperature of the corresponding tire 13 and wirelessly transmits transmission data including detected information of the tire 13 to the receiver 50. The tire condition monitoring apparatus 30 monitors the condition of the tire 13 by receiving the transmission data transmitted from the transmitter 31 through the receiver 50.

Figure 4:
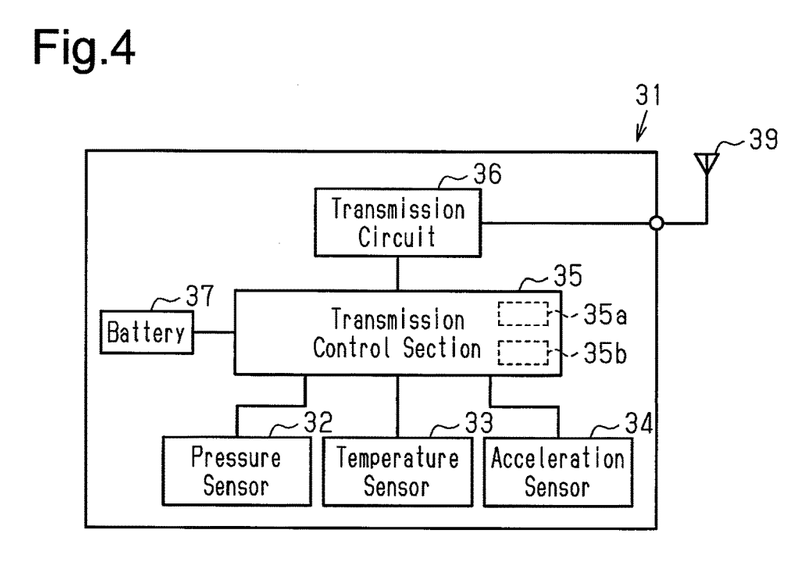
FIG. 4 is a block diagram illustrating a schematic configuration of a transmitter.

As shown in FIG. 4, each of the transmitters 31 includes a pressure sensor 32, a temperature sensor 33, an acceleration sensor 34, a transmission control section 35, a transmission circuit 36, a battery 37, and a transmission antenna 39. The transmitter 31 is driven by power supplied from the battery 37, and the transmission control section 35 controls operation of the transmitter 31 in an integrated manner. The battery 37 may be a primary battery or a power storage device such as a rechargeable battery and a capacitor.

The pressure sensor 32 detects the air pressure of the corresponding tire 13. The pressure sensor 32 outputs the detection result to the transmission control section 35. The temperature sensor 33 detects the temperature inside the corresponding tire 13. The temperature sensor 33 outputs the detection result to the transmission control section 35.

Figure 1B:
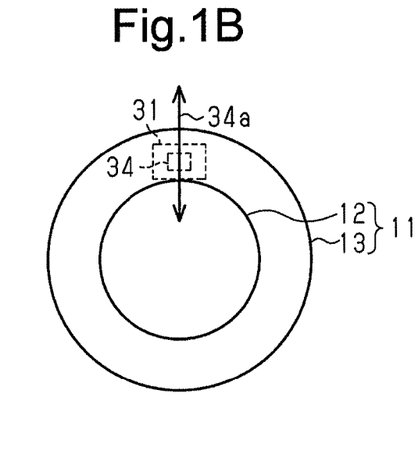
FIG. 1B is a schematic diagram illustrating the relationship between each wheel assembly of the vehicle and the detection axis of an acceleration sensor.

As shown in FIG. 1B, the acceleration sensor 34 includes a detection axis 34a so as to detect acceleration in the axial direction of the detection axis 34a. The acceleration sensor 34 outputs the detection result to the transmission control section 35. The acceleration sensor 34 may be a uniaxial acceleration sensor 34 or a multiaxial acceleration sensor 34.

The acceleration sensor 34 is arranged such that the detection axis 34a is directed downward in the vertical direction when the transmitter 31 is located at the lowermost position or the uppermost position of the wheel assembly 11.

If a multiaxial acceleration sensor 34 having a detection axis other than the detection axis 34a is employed, the acceleration applied in each of the detection axes is independently detected. Hereinafter, the acceleration detected by the acceleration sensor 34 denotes acceleration detected in the detection axis 34a.

As shown in FIG. 4, the transmission control section 35 is configured by a microcomputer or the like including a CPU 35a and a transmission storage section 35b (a RAM, a ROM and the like). An ID code indicating individual identification information of each of the transmitters 31 is stored in the transmission storage section 35b. For the illustrative purposes, the ID code of the transmitter 31 attached to the left front wheel assembly FL is referred to as FLID, the ID code of the transmitter 31 attached to the right front wheel assembly FR is referred to as FRID, the ID code of the transmitter 31 attached to the left rear wheel assembly RL is referred to as RLID, and the ID code of the transmitter 31 attached to the right rear wheel assembly RR is referred to as RRID.

Various programs for controlling the transmitter 31 are stored in the transmission storage section 35b. The transmission control section 35 includes a timing function. The timing function is implemented by, for example, a timer or a counter. The transmission control section 35 obtains detection results detected by the pressure sensor 32, the temperature sensor 33, and the acceleration sensor 34 at a predetermined obtaining interval.

The transmission control section 35 generates transmission data including, for example, a tire condition such as the tire air pressure and the tire internal temperature, and the ID code based on the detection result. The transmission control section 35 outputs the generated transmission data to the transmission circuit 36. The transmission circuit 36 modulates the transmission data output from the transmission control section 35. The modulated transmission data is transmitted from the transmission antenna 39 as a wireless signal. The wireless signal is transmitted as, for example, a signal of an RF band (for example, a 315 MHz band and a 434 MHz band). The transmission circuit 36 serves as a transmission section.

The transmitter 31 executes two different transmission modes: normal transmission, at which the transmission data is transmitted regardless of the rotation angle of the wheel assembly 11, and specific angle transmission, in which the transmission data is transmitted when the rotation angle of the wheel assembly 11 matches a predetermined specific angle.

At the normal transmission, the transmission data is transmitted at a predetermined interval. The predetermined interval is set to, for example, ten seconds to several tens of seconds. For example, the specific angle transmission is executed when the vehicle 10 is started to travel after the vehicle 10 has been in a stopped state continuously for a predetermined time or longer. The predetermined time is set to a time in which a tire can be replaced, for example, several tens of minutes to several hours. That is, the specific angle transmission is executed when the position of the wheel assembly 11 has possibly been changed due to tire rotation. Whether the vehicle 10 is traveling or in a stopped state is determined based on the centrifugal acceleration, which is the detection result of the acceleration sensor 34.

At the specific angle transmission, the transmission data is transmitted when the transmission control section 35 detects that the rotation angle of the wheel assembly 11 matches the predetermined specific angle. Specifically, the transmission control section 35 transmits the transmission data when the specific angle is detected and a predetermined time (for example, ten seconds to several tens of seconds) has elapsed since the last transmission of the transmission data.

Figure 5A:
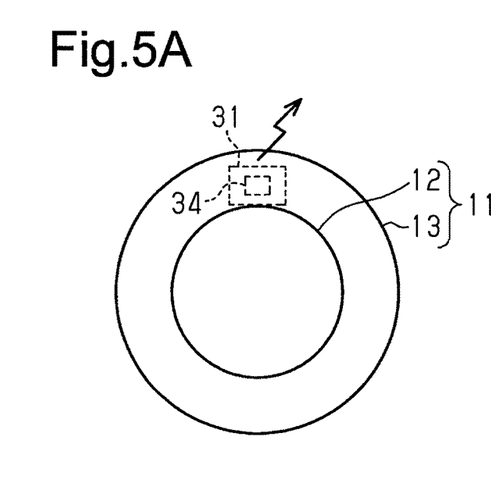
FIG. 5A is a schematic diagram illustrating a first angle.
Figure 5B:
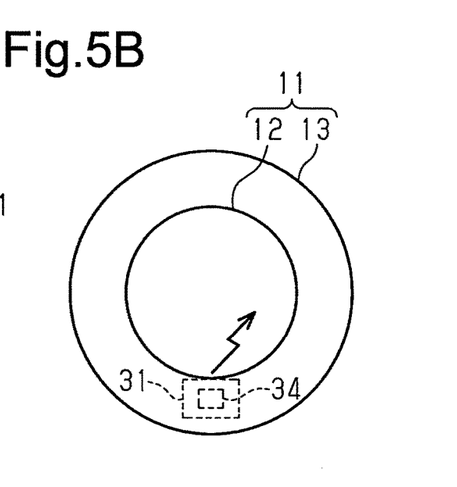
FIG. 5B is a schematic diagram illustrating a second angle.

As shown in FIGS. 5A and 5B, multiple specific angles are set, which include a first angle when the transmitter 31 is located at the uppermost position of the wheel assembly 11 and a second angle when the transmitter 31 is located at the lowermost position of the wheel assembly 11. When the first angle is defined as a reference (0°), the second angle is 180°. The angle difference between the first angle and the second angle is 180°.

Whether the transmitter 31 is located at a position corresponding to the specific angle can be detected based on the acceleration detected by the acceleration sensor 34. The axial direction of the detection axis 34a is the same as the direction in which the centrifugal force is applied regardless of the rotation angle of the wheel assembly 11. Thus, the acceleration sensor 34 detects the centrifugal acceleration regardless of the rotation angle of the wheel assembly 11. On the other hand, the gravitational acceleration is always applied in the vertical direction. Thus, in a case in which the detection axis 34a is not directed in the vertical direction, the acceleration sensor 34 detects a component force of the gravitational acceleration (a component of the gravitational acceleration). The acceleration sensor 34 detects an acceleration obtained by adding the gravitational acceleration to the centrifugal acceleration.

Unless the vehicle 10 is abruptly accelerated or stopped, the centrifugal acceleration changes slightly in one turn of the wheel assembly 11. Accordingly, the acceleration changed in one turn of the wheel assembly 11 is deemed as the gravitational acceleration. Thus, whether the rotation angle of the wheel assembly 11 matches the specific angle can be detected by using a change of the gravitational acceleration. When only the gravitational acceleration is considered, the gravitational acceleration changes in one turn of the wheel assembly 11 in a range between +1G and −1G inclusive. In this case, the gravitational acceleration is +1G when the transmitter 31 is located at the lowermost position of the wheel assembly 11, and the gravitational acceleration is −1G when the transmitter 31 is located at the uppermost position of the wheel assembly 11.

The transmission control section 35 transmits the transmission data when detecting that the rotation angle of the wheel assembly matches the specific angle by transmitting the transmission data based on the acceleration detected by the acceleration sensor 34. The transmission control section 35 transmits the transmission data alternately at the first angle and the second angle. The acceleration sensor 34 serves as a specific angle detecting section. The transmission angle at which the transmission data is transmitted varies with respect to the specific angle as the center of the variation due to the accuracy of the acceleration sensor 34, the obtaining interval in which the transmission control section 35 obtains the detection result from the acceleration sensor 34, or disturbance caused by the travelling condition. The number of the transmission angles, at which the transmission data is transmitted, becomes larger toward the specific angle.

The receiver 50 will now be described.

As shown in FIG. 1A, the receiver 50 includes a reception control section 51, a reception circuit 52, and a reception antenna 56. The reception control section 51 is connected to a display 57 mounted on the vehicle 10. The reception control section 51 is configured by a microcomputer or the like including a reception CPU 54 and a reception storage section 55 (a ROM, a RAM and the like). The reception control section 51 includes a timing function. The timing function is implemented by, for example, a timer or a counter. The reception circuit 52 demodulates the wireless signal received from each of the transmitters 31 via the reception antenna 56 and outputs the transmission data to the reception control section 51. The reception circuit 52 serves as a receiving section.

The reception control section 51 acquires the condition of the tire 13 such as the tire air pressure and the tire internal temperature based on the transmission data from the reception circuit 52. When an anomaly occurs in the tire 13, the reception control section 51 executes informing by using the display 57. The display 57 displays the pressure of each of the tires 13 in association with the positions of the wheel assemblies 11.

The reception storage section 55 stores the ID codes of the four transmitters 31 mounted on the wheel assemblies 11 of the vehicle 10 on which the receiver 50 is mounted. With this, the receiver 50 is associated with the transmitters 31. The reception control section 51 recognizes the transmission data transmitted from the four transmitters 31 as the transmission data transmitted to the reception control section 51. The reception control section 51 compares the identification information (ID code) registered to the transmitter 31 that has transmitted the transmission data with the identification information (ID code) registered to the receiver 50 based on the transmission data received by the reception circuit 52 and the ID code stored in the reception storage section 55. In a case in which the transmission data is transmitted from the transmitter 31 associated with the receiver 50, the reception control section 51 deems data (pressure data and temperature data) indicating the condition of the tire 13 included in the transmission data as data of the vehicle 10 on which the receiver 50 is mounted.

Next, a wheel assembly position identifying process for identifying the wheel assembly 11 to which each of the transmitters 31 is attached will be described together with the operation thereof. The wheel assembly position identifying process is executed, for example, when the vehicle 10 is switched from the deactivated state to the activated state through an operation of the start switch 14. Hereinafter, the transmission mode of the transmitter 31 is set to the specific angle transmission. With this, the reception control section 51 is capable of automatically recognizing the wheel assembly 11 to which each of the transmitters 31 is attached even when the tire rotation is performed.

The reception control section 51 obtains the pulse count values (the rotation angle of the wheel assembly 11) of the rotation sensor units 21 to 24 from the ABS controller 25 upon reception of the transmission data by the reception circuit 52, and the reception control section 51 calculates the rotation angle of the wheel assembly 11 based on the pulse count value. The reception control section 51 serves as an obtaining section. That is, the obtaining section is a part of the functions of the reception control section 51.

Hereinafter, the rotation angle obtained upon reception of the transmission data transmitted at the first angle is defined as a first obtained rotation angle, and the rotation angle obtained upon reception of the transmission data transmitted at the second angle is defined as a second obtained rotation angle. Further, the first obtained rotation angle and the second obtained rotation angle are collectively referred to as obtained rotation angles.

In the travelling of the vehicle 10, the numbers of rotations (the rotation speeds) of the wheel assemblies 11 are different from each other due to the influence of the differential gear or the like. Thus, the relative positions of the transmitters 31 attached to the wheel assemblies 11, namely the differences between the rotation angles of the wheel assemblies 11 change in accordance with the travelling of the vehicle 10. Thus, in a case in which the transmitters 31 transmit the transmission data at the specific angle, the reception control section 51 obtains the rotation angle of each of the four wheel assemblies 11 several times upon reception of the transmission data. Consequently, the variation of the rotation angle of one wheel assembly 11 among the four wheel assemblies 11 becomes small. In other words, in a case in which the transmitters 31 transmit the transmission data at the specific angles, when the pulse count value is obtained upon reception of the transmission data, one of the rotation sensor units 21 to 24 has a small value of the variation of the pulse count value.

Specifically, in a case in which the first obtained rotation angle is obtained upon reception of the transmission data transmitted at the first angle, one of the wheel assemblies 11 has a small variation in the first obtained rotation angle. Further, in a case in which the second obtained rotation angle is obtained upon reception of the transmission data transmitted at the second angle, one of the wheel assemblies 11 has a small variation in the second obtained rotation angle.

The pulse count value is reset when the vehicle 10 is set to the deactivated state by the start switch 14. Accordingly, the correlation between the absolute angle of the wheel assembly 11 detected by the rotation sensor units 21 to 24 and the specific angle is changed each time the vehicle 10 is switched to the deactivated state. On the other hand, the difference (angle difference) between the first obtained rotation angle and the second obtained rotation angle is not affected by the reset of the pulse count value. Accordingly, by using the difference between the obtained rotation angles, it is possible to identify the wheel assembly 11 to which each of the transmitters 31 is attached.

The reception control section 51 calculates the absolute value of the difference between an obtained rotation angle and a previously obtained rotation angle. The absolute value of the difference is calculated between the rotation angles obtained upon reception of the transmission data including the same ID code. The reception control section 51 calculates the absolute value of the difference between the obtained rotation angle and the rotation angle that was obtained the last time. Hereinafter, the absolute value of the difference is referred to as an angular difference. The reception control section 51 serves as a calculation section. That is, the calculation section is a part of the functions of the reception control section 51.

In some cases, the reception circuit 52 cannot receive the transmission data due to a null point or the communication environment. Thus, the angular difference is equal to any one of the difference between the first obtained rotation angle and the second obtained rotation angle, the difference between the first obtained rotation angles, and the difference between the second obtained rotation angles.

The reception control section 51 determines whether the angular difference is included in a predetermined range. As the predetermined range, two kinds of ranges, which are a reference range A1 and a specific range A2, are defined.

Figure 6:
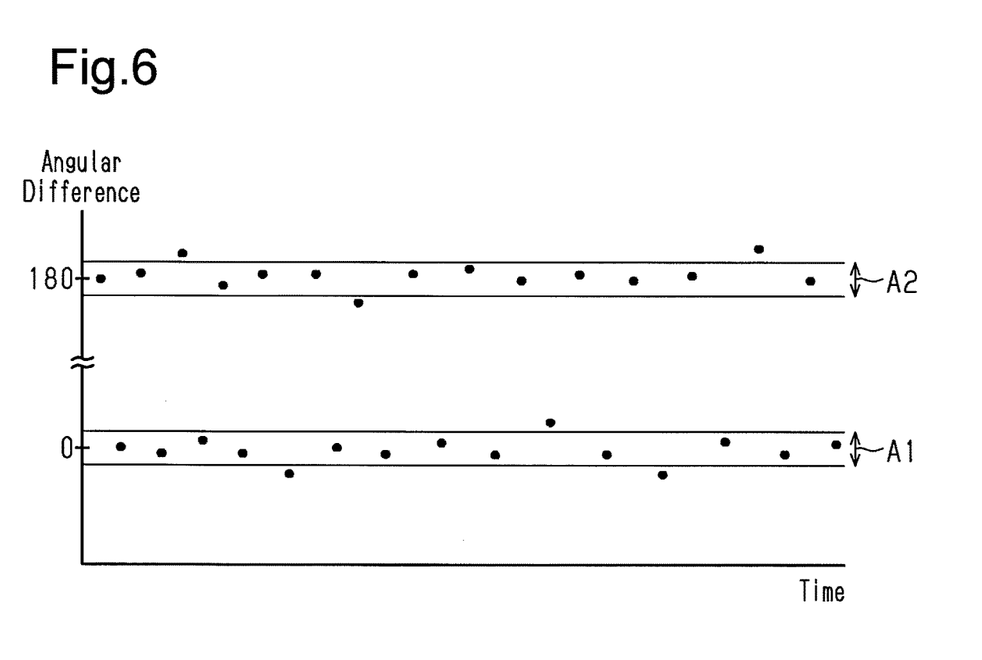
FIG. 6 is a graph illustrating a reference range and a specific range.

As shown in FIG. 6, the reference range is defined as a range including zero, for example, a range of 0±a predetermined value. The specific range A2 is defined as a range including the angle difference between the different specific angles, for example, a range of the angle difference between the different specific angles±a predetermined value. Since the angle difference between the first angle and the second angle is 180°, the specific range A2 is defined as a range of 180°±the predetermined value. The width of the reference range A1 is the same as the width of the specific range A2.

The predetermined value is set based on the variation of the transmission angle when the transmission data is transmitted based on the detection of the specific angle, or the like. The predetermine value is set based on simulation results or experimental results, and for example, the predetermined value is set to 7.5° (corresponding to two pluses).

As described above, in one of the four wheel assemblies 11, the variation of the first obtained rotation angle and the variation of the second obtained rotation angle are small. Accordingly, in one of the wheel assemblies 11, the number of times the angular difference between the first obtained rotation angles and the angular difference between the second obtained rotation angles are included in the reference range A1 is large. Further, in one of the four wheel assemblies 11, the angular difference between the first obtained rotation angle and the second obtained rotation angle matches the angle difference between the different specific angles. In reality, although there is a difference between the angular difference between the first obtained rotation angle and the second obtained rotation angle and the angle difference between the different specific angles may be generated due to the variation of the transmission angles, such a difference is small, and in one of the wheel assemblies 11, the number of times the difference is included in the specific range A2 is large. That is, the reference range A1 is a range in which the angular difference is included when the transmission data transmitted at the same specific angle is successively received. The specific range A2 is a range in which the angular difference is included when the transmission data transmitted at the different specific angles is successively received.

The reception control section 51 determines whether the angular difference is included in the reference range A1 or the specific range A2 by classifying the angular difference for each ID code included in the transmission data. The reception control section 51 integrates the number of times the angular difference of the four wheel assemblies 11 is included in the reference range A1 or the specific range A2 by classifying the angular difference for each ID code. Then the reception control section 51 calculates an integration value. Further, when the difference between the integration value of one of the four wheel assemblies 11 and the integration value of another wheel assembly 11 becomes greater than or equal to a threshold, the reception control section 51 associates the wheel assembly 11 having the largest integration value with the ID code. That is, the reception control section 51 associates the wheel assembly 11 in which the number of times the angular difference is included in the range A1 or A2 is extremely large with the ID code.

For example, the angular difference is calculated from the rotation angle of the right front wheel assembly FR obtained upon reception of the transmission data transmitted from the transmitter 31 of the FRID, and in a case in which the angular difference is distributed as shown in FIG. 6, it can be determined that the transmitter 31 of the FRID is attached to the right front wheel assembly FR. As shown in FIG. 6, the number of times the angular difference is included in the reference range A1 or the specific range A2 is large. In contrast, when the angular difference is calculated from the rotation angle of a wheel assembly 11 other than the right front wheel assembly FR obtained upon reception of the transmission data transmitted from the transmitter 31 of the FRID, the angular difference is distributed at random.

For illustrative purposes, in FIG. 6, the same degree of the angular difference is included in each of the reference range A1 and the specific range A2. However, in a case in which the null point is not considered, the number of times the angular difference is included in the specific range A2 tends to be larger because the first angle and the second angle are alternately transmitted.

After the reception control section 51 associates the FFID, the FRID, the RFID, and the RRID with the wheel assemblies 11 respectively, the correlation is stored in the reception storage section 55, and the wheel assembly position identifying process is finished. The reception control section 51 serves as an identifying section. That is, the identifying section is a part of the functions of the reception control section 51.

It is also possible to identify the wheel assembly 11 to which each of the transmitters 31 is attached by using only the reference range A1. As described above, the angular difference between the first obtained rotation angles and the angular difference between the second obtained rotation angles are both included in the reference range A1. Accordingly, when the transmission data is received, the first obtained rotation angle and the second obtained rotation angle can be classified by determining whether the transmission data is transmitted at the first angle or the second angle. Further, each of the angular difference between the first obtained rotation angles and the angular difference between the second obtained rotation angles is calculated, and it is possible to identify the wheel assembly 11 to which each of the transmitters 31 is attached by using those angular differences. However, in this case, the obtained rotation angle is dispersed into the first obtained rotation angle and the second obtained rotation angle.

In order to acquire a difference of the number of rotations (the rotation speed) of the wheel assembly 11, a predetermined number or more of samples of the rotation angle is necessary. In a case in which multiple specific angles are set and the obtained rotation angle is dispersed into the first obtained rotation angle and the second obtained rotation angle, the number of the samples available for the wheel assembly position identifying process is also dispersed in accordance with the number of times of transmission of the transmission data. In this regard, by setting the reference range A1 and the specific range A2, it is possible to identify the wheel assembly 11 to which each of the transmitters 31 is attached without classifying the first obtained rotation angle and the second obtained rotation angle. Accordingly, the number of samples available for the wheel assembly position identifying process is not dispersed. This reduces the time necessary for identifying the wheel assembly 11 to which each of the transmitters 31 is attached.

The wheel assembly position identifying process of the present embodiment may be employed together with another wheel assembly position identifying process. For example, a wheel assembly position identifying process that identifies the wheel assembly 11 to which each of the transmitters 31 is attached based on the variation of the obtained rotation angle may be executed in addition to the wheel assembly position identifying process of the first embodiment.

In this case, multiple wheel assembly position identifying processes may be executed in parallel, and the earlier determination result regarding the wheel assembly 11 to which each of the transmitters 31 is attached in the wheel assembly position identifying processes may be employed. Further, the wheel assembly 11 to which each of the transmitters 31 is attached may be identified based on the conformity between the determination results of the wheel assembly position identifying processes. For example, in a case in which the same determination result is obtained in multiple wheel assembly position identifying processes, the determination result thereof is employed, while in a case in which different determination results are obtained in the multiple wheel assembly position identifying processes, the wheel assembly position identifying processes may be executed again.

Accordingly, the first embodiment achieves the following advantages.

(1-1) By setting the reference range A1 and the specific range A2, the wheel assembly 11 to which each of the transmitters 31 is attached can be identified without classifying the first obtained rotation angle and the second obtained rotation angle. Accordingly, the number of the samples available for the wheel assembly position identifying process is not dispersed. This reduces the time necessary for identifying the wheel assembly 11 to which each of transmitters 31 is attached.

(1-2) The first angle and the second angle are set at the same interval. That is, the angle difference between the first angle and the second angle is the same in any rotation direction of the wheel assembly 11. Accordingly, only one specific range A2 needs to be set. This simplifies the process.

(1-3) When identifying the wheel assembly 11 to which each of the transmitters 31 is attached by using only the reference range A1, it is necessary to classify the first obtained rotation angle and the second obtained rotation angle. If the receiver 50 recognizes that the transmission data is transmitted alternately at the first angle and the second angle, the obtained rotation angles may be classified alternately. Further, in some cases, the transmission data cannot be received due to the communication environment or the like, and therefore the transmission data transmitted at the first angle (or the second angle) is successively received. Also in this case, since the interval of transmission of the transmission data is recognized, it is possible to recognize that the transmission data transmitted at the same specific angle is received two consecutive times in a case in which the receiving interval of the transmission data is twice the transmitting interval of the transmission data.

However, in a case in which the transmission data cannot be received for several consecutive times, it is difficult to identify the wheel assembly 11 to which each of the transmitters 31 is attached. This is because it cannot be determined whether the transmission data, which is received after the transmission data cannot be received for several consecutive times due to the accuracy of the timing function of the reception control section 51 or the like, is transmitted at the first angle or the second angle. That is, the reception control section 51 cannot classify the obtained rotation angle into the obtained rotation angle obtained upon reception of the transmission data transmitted at the first angle and the obtained rotation angle obtained upon reception of the transmission data transmitted at the second angle.

It may be considered that angular data indicating the specific angle is included in the transmission data. However, in this case, the data length becomes long by the angular data. When the data length of the transmission data becomes long, the electric power consumption by transmitting the transmission data becomes large. In a case in which the angular data is made short (for example, 1 bit) in order to prevent the data length from being long, errors might not be detected although the angular data is incorrect. Consequently, the reception control section 51 may erroneously recognize that the transmission data transmitted at the second angle is received despite the fact that the transmission data transmitted at the first angle is received. This may slow down or prevents the identifying the wheel assembly 11 to which each of the transmitters 31 is attached.

In this regard, in the first embodiment, the wheel assembly position identifying process can be executed without classifying the obtained rotation angle into the obtained rotation angle obtained upon reception of the transmission data transmitted at the first angle and the obtained rotation angle obtained upon reception of the transmission data transmitted at the second angle. Accordingly, even in a case in which the transmission data cannot be received for several consecutive times, it is possible to identify the wheel assembly 11 to which each of the transmitters 31 is attached. Further, it is not necessary to include the angular data in the transmission data. Accordingly, the data length of the transmission data is shortened, and the electric power required for the transmitting is reduced. Further, since the angular data is not included in the transmission data, the identifying the wheel assembly 11 to which each of the transmitters 31 is attached will not be slowed down by the occurrence of errors in the angular data.

Second Embodiment

Hereinafter, a transmitter unit and a receiver according to a second embodiment will be described. In the following, description of the same parts as those of the first embodiment will be omitted or simplified.

Figure 7:
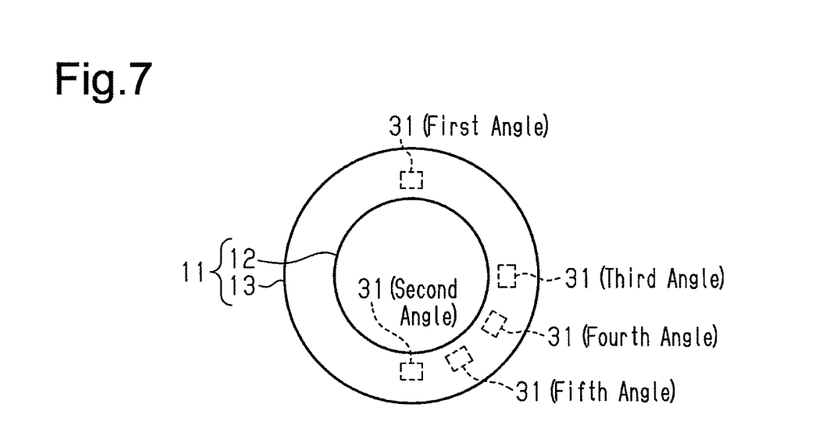
FIG. 7 is a schematic diagram illustrating a specific angle at which the transmitter transmits transmission data.

As shown in FIG. 7, similarly to the first embodiment, the angle at which the transmitter 31 is located at the uppermost position is defined as a first angle, and the angle at which the transmitter 31 is located at the lowermost position is defined as a second angle. The first angle is shifted from the second angle by 180°. The angle at which the transmitter 31 is located at a position shifted from the position of the first angle by 90° is defined as a third angle. The angle at which the transmitter 31 is located at a position shifted from the position of the first angle by 120° is defined as a fourth angle. The angle at which the transmitter 31 is located at a position shifted from the position of the first angle by 150° is defined as a fifth angle.

The transmitters 31 are grouped to correspond to the last digit of the ID codes when the ID codes are represented as hexadecimal numbers. Since the number of wheel assemblies 11 is four, the ID codes are grouped into four groups. The number of the groups may be changed in accordance with the number of the wheel assemblies 11.

Of the last digits of the ID codes represented as hexadecimal numbers, the first group is defined by the ID codes each including the last digit of 0 to 3, the second group is defined by the ID codes each including the last digit of 4 to 7, the third group is defined by the ID codes each including the last digit of 8 to B, and the fourth group is defined by the ID codes each including the last digit of C to F.

Figure 8:
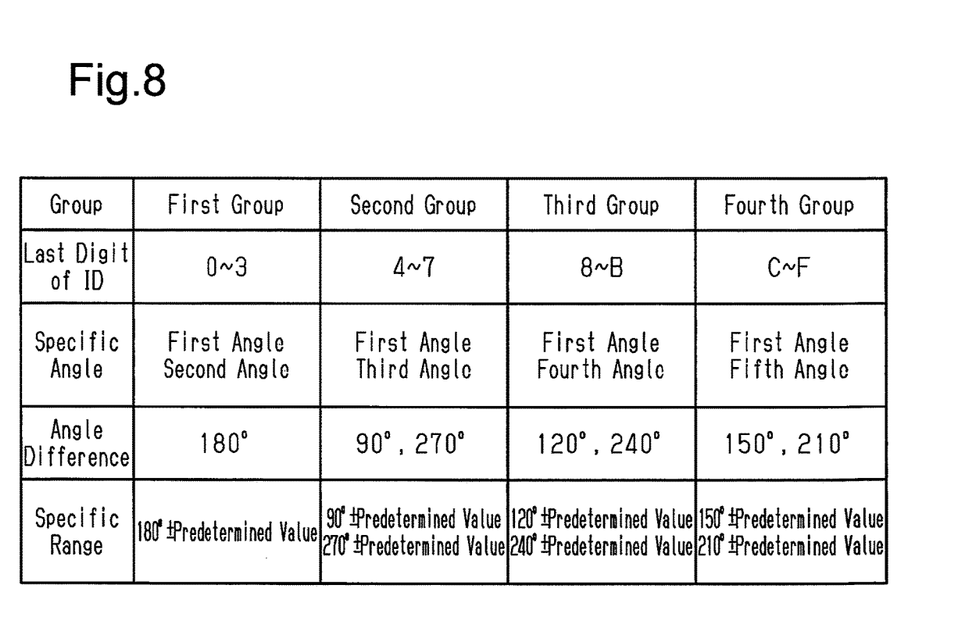
FIG. 8 is a table illustrating a correspondence relationship between the specific angles, angle differences between different specific angles, the specific regions, and the last digits of ID codes.

As shown in FIG. 8, in the transmitter 31 of the first group, the first angle and the second angle are defined as specific angles. In the transmitter 31 of the second group, the first angle and the third angle are defined as specific angles. In the transmitter 31 of the third group, the first angle and the fourth angle are defined as specific angles. In the transmitter 31 of the fourth group, the first angle and the fifth angle are defined as specific angles. That is, the specific angles are different in accordance with the last digit of the ID code, and therefore the angle difference between the specific angles varies in accordance with the specific angles.

The transmitter unit U includes one transmitter 31 of each of the groups. With this, each of the transmitters 31 of the transmitter unit U has the angle difference between the different specific angles, and the angle difference between the different specific angles varies among the transmitters 31.

The reception storage section 55 stores different specific ranges A2 in association with the last digits (the groups) of the ID codes. The specific range A2, which is the same as that of the first embodiment, is associated with the first group. A specific range A2 including 90°, which is the angle difference between the first angle and the third angle, is associated with the second group. A specific range A2 including 120°, which is the angle difference between the first angle and the fourth angle, is associated with the third group. A specific range A2 including 150°, which is the angle difference between the first angle and the fifth angle, is associated with the fourth group. That is, the specific range A2 is defined to correspond to the angle difference between the different specific angles. Further, the angle difference between the first angle and the third angle can be also deemed as 270°, and the angle difference between the first angle and the fourth angle can be also deemed as 240°. Likewise, the angle difference between the first angle and the fifth angle can be also deemed as 210°. The specific range A2 including 270° is further associated with the second group, the specific range A2 including 240° is further associated with the third group, and the specific range A2 including 210° is further associated with the fourth group. That is, in a case in which two angle differences between the different specific angles are not the same as each other, multiple specific ranges A2 are set in accordance with the difference in the angle differences.

The reception control section 51 determines, based on the ID code included in the transmission data, whether the angular difference is included in the specific range A2 that corresponds to the angle difference between the specific angles of the transmitter 31 that has transmitted the transmission data. Further, similarly to the first embodiment, the reception control section 51 identifies the wheel assembly 11 to which each of the transmitters 31 is attached based on the number of times the angular difference is included in the specific range A2.

When checking whether the angular difference is included in the specific range A2, the second embodiment allows for checking whether the transmission data is transmitted at the specific angle matched with the ID code of the transmitter 31. For example, it is assumed that the transmitter 31 of the FRID is used as the transmitter 31 of the first group, and a rotation sensor unit is provided in which the angular difference of the rotation angles obtained upon reception of the transmission data transmitted from the transmitter 31 of the FRID is 120°. When the position of the wheel assembly 11 to which the transmitter 31 is attached is identified based on only the correlation between the angular difference of the rotation angles obtained upon reception of the transmission data and the angle difference between the specific angles as described in the first embodiment, it may be determined that the transmitter 31 of the FRID is attached to the wheel assembly 11 corresponding to the rotation sensor unit that detects the angular difference of 120°. However, as shown in FIG. 8, since the transmitter 31 of the first group transmits the transmission data at the angle difference of 180°, the determination is incorrect.

In this regard, the reception control section 51 of the second embodiment determines that the transmitter 31 of the FRID is the transmitter 31 of the first group based on the last digit of the ID code of the transmitter 31. That is, when the rotation angle of each of the wheel assemblies 11 is obtained upon reception of the transmission data transmitted from the transmitter 31 of the FRID, the reception control section 51 determines that the angular difference matched with the ID code of the transmission data is 180°. This prevents determination that the transmitter 31 of the FRID is attached to the wheel assembly 11 corresponding to the rotation sensor unit that has detected the angular difference of 120°. In this case, another execution of the wheel assembly position identifying process allows for identification of the wheel assembly 11 to which each of the transmitters 31 is attached.

In addition to the advantages (1-1) to (1-3) of the first embodiment, the second embodiment achieves the following advantages.

(2-1) The reception storage section 55 stores the ID code and the specific range A2 including the angle difference between the specific angles to be associated with each other. Thus, even if the angle difference between the specific angles varies among the transmitters 31, it is possible to identify the wheel assembly 11 to which each of the transmitters 31 is attached. Further, since whether the transmission data is transmitted at the specific angle matched with the ID code (the transmitter 31) is checked, the reliability of the identification of the wheel assembly 11 to which each of the transmitters 31 is attached is improved.

(2-2) Each of the transmitters 31 of the transmitter unit U transmits the transmission data when any of multiple specific angles is detected. Thus, each of the transmitters 31 can cause the receiver 50 to identify the wheel assembly 11 to which each of the transmitters 31 is attached based on the angle difference between different specific angles. Further, each of the transmitters 31 has the angle difference between the different specific angles, and the angle difference between the different specific angles varies among the transmitters 31. Thus, each of the transmitters 31 can cause the receiver 50 to check whether the transmission data is transmitted at the specific angle matched with the ID code (the transmitter 31). This improves the reliability of the identification of the wheel assembly 11 to which each of the transmitters 31 is attached.

The above-described embodiments may be modified as follows.

In each embodiment, the difference between the obtained rotation angle and a previously obtained rotation angle may be set to the difference between an obtained rotation angle and another rotation angle that was obtained two or more times before the obtainment of the former rotation angle. Further, since the pulse count value is reset when the vehicle 10 is switched to the deactivated state, "a previously obtained rotation angle" indicates a rotation angle obtained after the vehicle 10 is switched to the activated state and therefore it does not include a rotation angle obtained before the vehicle 10 is activated.

The wheel assembly position identifying process using the difference between an obtained rotation angle and another rotation angle that was obtained two or more times before the obtainment of the former obtained rotation angle and the wheel assembly position identifying process described in the embodiments may be used together. Further, the wheel assembly position identifying process using the difference between an obtained rotation angle and another rotation angle that was obtained two or more times before the obtainment of the former obtained rotation angle may be executed instead of the wheel assembly position identifying process described in the embodiments.

In each embodiment, the angle difference between the different specific angles may be changed as needed.

In each embodiment, the transmission data does not necessarily need to be transmitted alternately at the first angle and the second angle. For example, the transmission data may be transmitted at the first angle and the second angle at random. Alternatively, the transmission data may be transmitted at the first angle or the second angle consecutively until switched to the other.

In each embodiment, the reception storage section 55 may store the ID codes of the transmitters 31 attached to the wheel assemblies 11 and the ID code of the transmitter 31 attached to the spare tire. Further, the reception storage section 55 may store both of the ID codes of the transmitters 31 attached to summer tires and the ID code of the transmitters 31 attached to winter tires.

In each embodiment, the vehicle 10 only has to include multiple wheel assemblies 11, and for example, the vehicle 10 may be a motorcycle.

In each embodiment, the number of the teeth of the gear 26 of the vehicle 10 may be set to any number. That is, the resolution of the rotation angle detecting section may be different from that in each embodiment.

In each embodiment, various processes are executed by converting the pulse count value into the rotation angle. However, the process can be executed by using the pulse count value, considering the fact that the pulse count value indicates the rotation angle. For example, the difference may be set to the difference of the pulse count values, and each of the reference range A1 and the specific range A2 may be set to a range of the pulse count value. The rotation angle is not limited to the rotation angle as it is, and therefore the rotation angle may be set to any value that indicates the rotation angle.

In each embodiment, each of the reference range A1 and the specific range A2 may be changed as needed. For example, the reference range A1 may be set to a range of 0+a predetermined value, or 0−a predetermined value. The predetermined value to be added to 0 may be larger or smaller than the predetermined value to be subtracted from 0. This is similarly applicable to the specific range A2.

In each embodiment, the predetermined value may be set to a variable value. For example, the predetermined value may be set to be large when the wheel assembly position identifying process is started, and the predetermined value may be set to be smaller as the time in which the wheel assembly position identifying process is executed elapses. With this, the width of each of the reference range A1 and the specific range A2 becomes variable.

In each embodiment, the widths of the reference range A1 and the specific range A2 do not necessarily need to be the same as each other. For example, the width of the specific range A2 may be smaller than the width of the reference range A1.

In each embodiment, the number of the specific angles may be set to three or more.

In each embodiment, the wheel assembly position identifying processes using only the reference range A1 may be used together.

In the second embodiment, the angle difference between the different specific angles is changed in accordance with the last digit of the ID code. However, the present disclosure is not limited to this. The last digit of the ID code may be set to the same number or character as long as the angle difference between different specific angles varies among the transmitters 31 of the transmitter unit U. Further, the reception storage section 55 only needs to store the ID code of the transmitter 31 associated with the receiver 50 and the angle difference between the different specific angles of the transmitter 31.

In the first embodiment, in a case in which the angular difference is less than 180°, the reception control section 51 uses the angular difference as it is. In a case in which the angular difference is equal to or greater than 180°, the reception control section 51 subtracts the angular difference from 360° and corrects the angular difference. In this case, the obtained angular difference is less than 180°. The reception control section 51 determines whether the angular difference in a case in which the angular difference is less than 180° and the corrected angular difference are included in the reference range A1 or the specific range A2.

Likewise, in the second embodiment, in a case in which the angular difference is less than 180°, the reception control section 51 may use the angular difference as it is. In a case in which the angular difference is equal to or greater than 180°, the reception control section 51 may subtract the angular difference from 360° and correct the angular difference. In this case, the obtained angular difference is less than 180°. Accordingly, the specific range may be set to one range corresponding to an angle less than 180°. In the second embodiment, the specific range of the second group is set to a range of 90°±a predetermined value, the specific range of the third group is set to a range of 120°±a predetermined value, and the specific range of the fourth group is set to a range 150°±a predetermined value.

In the first embodiment, the angular difference is defined as the absolute value of the difference between the obtained rotation angle and the rotation angle that was obtained the last time. However, the angular difference does not necessarily need to be defined as the absolute value of the difference. In this case, the difference between the rotation angle obtained upon reception of the transmission data including the same ID code and the rotation angle obtained the last time is around +180°, −180°, or 0°. In a case in which the difference described above is less than −180°, the reception control section 51 corrects the difference by adding 360° to the difference. In a case in which the difference described above is equal to or greater than −180° and equal to or less than +180°, the reception control section 51 sets the difference to the value thereof as it is. In a case in which the difference described above is greater than +180°, the reception control section 51 corrects the difference by subtracting 360° from the difference. The specific ranges A2 are set to correspond to the positive or negative. Specifically, the specific range A2 may be set to a range of +180°−a predetermined value, and a range of −180°+a predetermined value. Since the specific ranges A2 are set to correspond to the positive or negative, the number of the specific ranges A2 is larger than that in the first embodiment.

Likewise, in the second embodiment, the angular difference does not necessarily need to be defined as the absolute value of the difference. Also in this case, similarly to the configuration described above, in a case in which the difference is equal to or greater than −180° and equal to or less than +180°, the reception control section 51 sets the difference to the value thereof as it is. In a case in which the difference is less than −180° or greater than +180°, the reception control section 51 corrects the difference. Further, also in this case, the specific ranges A2 are set to correspond to the positive and negative.

In the second embodiment, the grouping may be implemented by using the value of a specific bit instead of the last digit of the ID code.

In the second embodiment, the number of the specific ranges A2 may be one. In this case, the angular difference is corrected, and it is determined whether the value obtained by the correction is included in the specific range A2. As shown in FIG. 8, the angle differences between the specific angles are 90° and 270° in the transmitter 31 of the second group. The reception control section 51 corrects the angular difference by using the difference of the angular differences of 180°. For example, the determination described above can be executed by dividing the angular difference by 180° by deeming the angle difference between the first angle and the third angle as 90°. In this case, the specific range A2 may be set to correspond to a range of 90°. Further, in a case in which the angular difference is equal to or greater than 180°, a similar result can be obtained by subtracting 180°.

In a case in which the angular difference is less than 180°, the reception control section 51 may add 180° to the angular difference. In this case, the determination described above can be executed by deeming the angle difference between the first angle and the third angle as 270°. In this case, the specific range A2 may be set to correspond to a range of 270°.

Relating to the transmitter 31 of the third group and the transmitter 31 of the fourth group, the number of the specific ranges A2 can be set to one by similarly correcting the angle difference.

In a case in which the number of the specific angles is equal to or greater than three, the number of the specific ranges A2 can be set to one by correcting the absolute value of the difference to deem the angle differences between the specific angles as the same angle difference.

DESCRIPTION OF THE REFERENCE NUMERALS

U . . . Transmitting Unit; 10 . . . Vehicle; 11 . . . Wheel Assembly; 21 to 24 . . . Rotation Sensor Unit; 25 . . . ABS Controller; 30 . . . Tire Condition Monitoring Apparatus; 31 . . . Transmitter; 34 . . . Acceleration Sensor (Specific Angle Detecting Section); 35$b$ . . . Transmission Storage section; 36 . . . Transmission Circuit (Transmission section); 50 . . . Receiver; 51 . . . Reception Control Section (Obtaining Section, Calculation Section, and Identifying Section); 52 . . . Reception Circuit (Receiving section); 55 . . . Reception Storage Section.

The invention claimed is:

1. A receiver configured to be mounted on a vehicle having rotation angle detecting sections each of which detects a rotation angle of one of wheel assemblies, wherein a transmitter is attached to each wheel assembly, the receiver being configured to identify the wheel assembly to which each transmitter is attached, the receiver comprising:

a receiving section configured to receive transmission data that is transmitted from each transmitter when the transmitter detects that the associated wheel assembly is at any of specific angles set in possible rotation angles of the wheel assembly;

an obtaining section configured to obtain the rotation angle from the rotation angle detecting section upon reception of the transmission data by the receiving section;

a calculation section configured to calculate a difference between the rotation angle obtained by the obtaining section and a previously obtained rotation angle; and an identifying section configured to determine whether the difference calculated by the calculation section is included in a predetermined range and associates an ID code included in the transmission data with the wheel assembly based on the number of times the difference is included in the range, wherein the range includes a reference range that includes 0, and a specific range that includes an angle difference between different specific angles, wherein the angle difference varies among the transmitters, and the receiver further comprises a reception storage section that stores the ID codes of the transmitters while associating the ID codes with the specific range.

2. A transmitter unit comprising a plurality of transmitters, each of which is configured to be attached to one of wheel assemblies of a vehicle each having a rotation angle detecting section that detects a rotation angle of the associated wheel assembly and transmits transmission data to a receiver mounted on the vehicle, wherein the receiver is configured to identify the wheel assembly to which each transmitter is attached based on whether a difference between the rotation angle obtained from the rotation angle detecting section upon reception of the transmission data and a previously obtained rotation angle is included in a plurality of predetermined ranges, each transmitter includes a transmission storage section in which an individual ID code is stored, a specific angle detecting section configured to detect that the wheel assembly is at any of specific angles set in possible rotation angles of the wheel assembly, and a transmission section configured to transmit the transmission data including the ID code when detecting that the rotation angle of the wheel assembly matches one of the specific angles, thereby causing the receiver to identify the wheel assembly to which the transmitter is attached, and the angle difference between the different specific angles varies among the transmitters.

* * * * *